United States Patent Office 3,268,603
Patented August 23, 1966

3,268,603
PRODUCTION OF HALOGENATED ORGANIC
COMPOUNDS
Anthony George Goble, Sunbury-on-Thames, England, assignor to The British Petroleum Company Limited, London, England, a British joint-stock corporation
No Drawing. Filed May 6, 1963, Ser. No. 278,397
Claims priority, application Great Britain, May 15, 1962, 18,631/62
9 Claims. (Cl. 260—658)

This invention relates to a process for the production of halogenated organic compounds.

According to the present invention a halogen-substituted paraffin is passed with an olefinically unsaturated compound over a halogenated catalyst obtained by contacting a halogenatable inorganic oxide with a compound containing the group

where Ha and Ha′ are halogen atoms, being the same or different under conditions such that constituent parts of the halogen-substituted paraffin undergo addition across the olefinic bond of said olenfinically unsaturated compound.

Preferably the process of this invention is carried out at a temperature within the range —30° to 100° C.

Pressure may be sub-atmospheric, atmospheric or super-atmospheric.

The feedstock may be passed over the catalyst in vapour phase or in liquid phase. Preferably there is employed an inert carrier gas, for example, nitrogen.

The olefinically unsaturated compound may be, for example, an olefinically unsaturated hydrocarbon or an olefinic chloride.

Typical compounds include 1,1,2-trichloroethylene ($CCl_2=CHCl$), and 1,2-dichloroethylene $$(CHCl=CHCl)$$

ethylene, propylene, n- and iso-butenes and higher olefins.

Typical halogen substituted paraffins include $CHCl_3$, $CCl_4$, $CH_2Cl—CHCl_2$ and 1,3-dichloro-3-methylbutane.

Typical halogen substituted paraffin include $CHCl_3$, to the invention are represented by the equations:

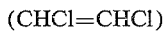

$CCl_2=CHCl+CHCl_3 \rightarrow CCl_3—CHCl—CHCl_2$
$CHCl_3+Cl_2C=CCl_2 \rightarrow CHCl_2—CCl_2—CCl_3$
$CCl_2=CHCl+CCl_4 \rightarrow CCl_3—CHCl—CCl_3$
$CH_2Cl—CHCl_2+CHCl=CHCl$
$\rightarrow CH_2Cl—CHCl—CHCl—CHCl_2$

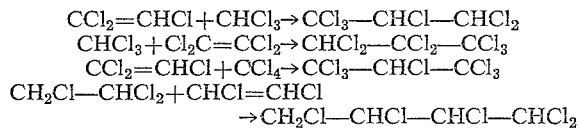

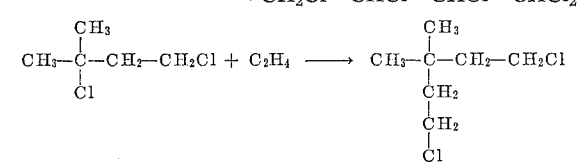

Preferably the halogenatable inorganic oxide is a refractory oxide selected from Groups III to V or from Group VIII of the periodic table, for example alumina, boria, silica, titania, zirconia or ferric oxide. The preferred refractory oxide is alumina. Mixtures of two or more inorganic oxides may be used if desired.

When alumina is used in the formation of the catalyst this alumina will preferably contain some hydrogen. This is a characteristic of activated aluminas which although predominantly alumina do contain a small amount of hydrogen, usually less than 1% wt. This hydrogen is generally considered to be in the form of surface hydroxyl groups, and it is believed that the halogen compound introduces halogen into the alumina at the positions of at least some of the original surface hydroxyl sites to form the active catalyst sites.

Any of the forms of alumina suitable as a base for reforming catalysts may be used, but a particularly preferred form is one derived from an alumina hydrate precursor in which the trihydrate predominates. One containing a major proportion of beta-alumina trihydrate is particularly suitable. A convenient method of preparing the alumina is by hydrolysis of an aluminium alcoholate, for example, aluminium isopropoxide, in an inert hydrocarbon solvent, for example, benzene. Other things being equal, the greater the amount of halogen taken up by the alumina, the greater is the activity of the catalyst and since, as stated above, the maximum amount of halogen which can be added is related to the surface area, it is desirable that the alumina should have a high surface area, for example more than 250 sq. metres/gram and preferably more than 300 sq. metres/gram.

Suitably the halogenatable inorganic oxide, before halogenation, is treated with an alkali metal compound or alkaline earth metal compound under conditions such that alkali metal or alkaline earth metal is retained by the oxide.

Preferably the alkali metal compound or alkaline earth metal compound which is used in the formation of the catalyst is an ionic compound. Preferably this compound is a compound which is capable of providing metal cations under the conditions under which it is brought into contact with the inorganic oxide or under conditions employed subsequently but prior to halogenation of the catalyst.

The precise way in which the addition of an alkali metal or alkaline earth metal acts to alter the activity of the catalyst is not known for certain but it is believed that the metal cation combines in some way with the inorganic oxide. Preferably therefore the oxide is treated after the contacting to dissociate the alkali metal compound or alkaline earth metal compound, for example by calcination, and the compound used is preferably one which can be dissociated without leaving other elements on the oxide. Particularly suitable compounds are salts or organic acids, particularly carboxylic acids, for example formates, acetates and oxalates. The alkali metal compound or alkaline earth metal compound may conveniently be added to the inorganic oxide by impregnation using a solution of the compound. The compound of alkali metal or alkaline earth metal retained may be small in relation to the amount of inorganic oxide, for example in the range 0.01–10% wt. by weight of inorganic oxide. The minimum amount necessary in any given application to render the catalyst selective may be determined by experiment. Metal present in excess of this minimum amount is not deleterious and it has been found that appreciable amounts of halogen can be taken up by oxides containing for example 4% by wt. or higher of alkali metal.

Preferably the catalyst is obtained by contacting the treated inorganic oxide, at elevated temperature, with the vapour of a compound of general formula:

(where X and Y may be the same or different and selected from H, Cl, Br or SCl, or where X and Y together may be O or S). However, if desired other halogen containing agents may be used.

Preferably the compound employed is one in which the group $>CCl_2$ is not directly attached to a carbon atom.

The subsequent chlorination is essentially the same as that disclosed in the complete specification of copending U.S. patent application S.N. 135,426, filed September 1, 1961; the catalyst containing $2.0 \times 10^{-4}$ to $3.5 \times 10^{-4}$ g. chlorine/sq. meter of surface area. Suitable compounds having the required structural formula are:

Carbon tetrachloride ($CCl_4$)
Chloroform ($CHCl_3$)
Methylene chloride ($CH_2Cl_2$)
Trichlorobromomethane ($CCl_3SCl$)
Phosgene ($COCl_2$)
Thiophosgene ($CSCl_2$)

The first three compounds listed are preferred. In the case of compounds containing elements other than chlorine, carbon and hydrogen, the treatment may add the other elements to the catalyst in addition to the chlorine. The presence of these other elements does not effect the activity conferred by the chlorine, but it may confer other properties and care should, therefore, be exercised to ensure that the selectivity of the catalyst is not affected. Small amounts of halogen (including chlorine) may also be present in the catalyst prior to the chlorination treatment without affecting the activity conferred by the chlorination. Thus the inorganic oxide subjected to the process of the present invention may be a platinum-alumina catalyst containing up to 1% wt. of halogen such as is normally used for the reforming of gasoline boiling range hydrocarbons.

Preferably the temperature, time of contact and amount of halogen-containing compound used in the formation of the catalyst are such that the up-take of halogen is at least 1% by weight. Since the halogenation is essentially a surface phenomenon the amount of halogen which can be added without the formation of free metal halide is related to the surface area of the catalyst; the greater the surface area, the greater is the amount of halogen which can be added without the formation of free halide; this is usually at least half the amount which could have been added without the formation of free halide if the catalyst had not been treated with an alkali metal or alkaline earth metal.

The non-reducing conditions used for the halogenation may be either inert or oxidising conditions, the latter being preferred. A convenient method of contacting the metal oxide is to pass a gaseous stream of the halogen compound over the metal oxide either alone or, preferably, in a non-reducing carrier gas. Examples of suitable carrier gases are nitrogen, air or oxygen.

Non-reducing conditions are preferred since, in the case of some catalysts, reducing conditions tend to convert the halogen compound to hydrogen halide, which gives an inactive catalyst. The temperature for the halogenation may be from 300–1100° F. (149–593° C.). The tendency when using alumina to form free aluminum halide increases with temperature and care should, therefore, be exercised when using the higher temperatures within the stated range. Since the temperatures used will normally be above the volatilisation temperature of aluminum halide the formation of free aluminum halide is readily detected by its appearance in the gaseous reaction products. When treating a platinum group metal-alumina composite, care should also be exercised to prevent the formation of volatile platinum complexes, the tendency for the formation of such complexes again increasing with increasing temperature. When treating platinum group metal-alumina composites the temperature is preferably 300–700° F. (149–371° C.), platinum-on-alumina composites being more particularly treated at 450–600° F. (232–316° C.) and palladium-on-alumina composites at 500–650° F. (260–343° C.). The chlorination reaction is exothermic and the temperatures specified are the initial temperatures used.

The rate of addition of the halogen compound is preferably as low as practicable to ensure uniform halogenation and to avoid a rapid increase of temperature as a result of the exothermic reaction. Preferably the addition rate does not exceed 1.3% wt. of halogen compound by weight of catalyst per minute. If a carrier is used, the rate of flow is preferably at least 200 volumes/volume catalyst/hour and a convenient range is 200–1000 v./v./hr. The pressure used is conveniently atmospheric.

The active catalyst is susceptible to hydrolysis in the presence of water and should, therefore, be stored under anhydrous conditions. Similarly the materials used in the catalyst preparation should also be free from water. Suitable conditions for forming the catalyst are described in copending U.S. patent applications S.N. 135,426, filed September 1, 1961, and S.N. 239,048, filed November 20, 1962.

The invention is illustrated by but not limited with reference to the following example.

*Example*

A chlorinated alumina catalyst was prepared by contacting an alumina catalyst maintained at 290 to 327° C. with a stream of dry air at 1700 v./v./hr. containing 0.49 vol. percent carbon tetrachloride vapour for 4 hours. The resulting catalyst has a chlorine content of 11.8% by wt. and a pore volume of 0.30.

1,1,1,2,2,3,3-heptachloropropane was prepared by refluxing 50 mls. of an equimolecular mixture of tetrachloroethylene and chloroform with 10 mls. of the catalyst for 2 hours at 84° C. The reaction products were then separated into a distillate fraction boiling below 138° C. and a residue consisting essentially of 1,1,1,2,2,3,3-heptachloropropane. The residue crystallised on cooling and represented a yield of 25% by wt. of the feed mixture.

The crystalled material was purified by recrystallisation from chloroform and had a melting point of 28.5–29.5° C.

I claim:

1. A process which comprises passing at a temperature in the range of −30°–100° C. a lower alkyl chloride with an olefinically unsaturated compound selected from the group consisting of lower olefinic hydrocarbons and their chloro-substituted derivatives over a halogenated catalyst prepared by contacting a halogenatable oxide selected from the group consisting of refractory oxides having a surface area greater than 250 sq. metres/gram of metals of Groups III to V of the Periodic Table according to Mendeléeff with a chlorine-containing compound of general formula

where X and Y when monovalent, are selected from the group consisting of H, Cl, Br and SCl, and X and Y, when together are divalent, are selected from the group consisting of O and S, said chlorine-containing compound being used under non-reducing conditions and at a temperature in the range 149–593° C., such that chlorine is taken up by said oxide without the production of free chloride, said catalyst containing from $2.0 \times 10^{-4}$ to $3.5 \times 10^{-4}$ chlorine/sq. metre of surface area.

2. A process according to claim 1 wherein the refractory oxide is alumina.

3. A process according to claim 1 wherein the halogen-substituted paraffin is selected from the group consisting of $CHCl_3$, $CCl_4$, $CH_2Cl$—$CHCl_2$ and 1,3-dichloro-3-methylbutane.

4. A process according to claim 1 wherein the olefinically unsaturated hydrocarbon is selected from the group consisting of ethylene, propylene, n-butene and isobutene.

5. A process according to claim 1 wherein the olefinic chloride is selected from the group consisting of 1,1,2-trichloroethylene, 1,2-dichloroethylene and tetrachloroethylene.

6. A process according to claim 1 wherein the halogenatable inorganic oxide bears a metal compound selected from the group consisting of alkali metal compounds and alkaline earth metal compounds in an amount between 0.01 to 10% by weight of the inorganic oxide.

7. A process according to claim 1 wherein the chlorine containing compound is carbon tetrachloride.

8. A process according to claim 1 wherein the chlorine containing compound is chloroform.

9. A process according to claim 1 wherein the chlorine containing compound is methylene chloride.

References Cited by the Examiner

UNITED STATES PATENTS

| | | | |
|---|---|---|---|
| 2,353,766 | 7/1944 | Schmerling | 260—658 |
| 2,481,158 | 9/1949 | Schmerling | 260—658 |
| 2,481,159 | 9/1949 | Schmerling | 260—658 |
| 2,501,597 | 3/1950 | Detling | 260—652 |
| 2,533,053 | 12/1950 | Schmerling | 260—652 |
| 2,642,384 | 6/1953 | Cox | 208—139 |

OTHER REFERENCES

Thomas: Anhydrous Aluminum Chloride, Reinhold (New York, 1941), pages 857–861.

LEON ZITVER, *Primary Examiner.*

D. D. HORWITZ, *Examiner.*

K. V. ROCKEY, *Assistant Examiner.*